(12) United States Patent
Barajas et al.

(10) Patent No.: US 9,098,448 B2
(45) Date of Patent: Aug. 4, 2015

(54) INTELLIGENT BOOT SERVICES

(75) Inventors: Gaston M. Barajas, Austin, TX (US); Shree A. Dandekar, Round Rock, TX (US); Bogdan Odulinski, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1351 days.

(21) Appl. No.: 11/754,444

(22) Filed: May 29, 2007

(65) Prior Publication Data
US 2008/0301424 A1 Dec. 4, 2008

(51) Int. Cl.
*G06F 9/44* (2006.01)
*G06F 9/445* (2006.01)
*G06F 11/14* (2006.01)

(52) U.S. Cl.
CPC .......... *G06F 11/1417* (2013.01); *G06F 9/4401* (2013.01); *G06F 9/4403* (2013.01); *G06F 9/4406* (2013.01)

(58) Field of Classification Search
CPC ....... G06F 9/00; G06F 11/00; G06F 11/1417; G06F 15/177; G06F 9/4401; G06F 9/4403; G06F 9/4406; G06F 11/142; G06F 21/56; G06F 9/44; G06F 9/445; G06F 21/575
USPC ................................................ 713/1, 2, 100
See application file for complete search history.

(56) References Cited

U.S. PATENT DOCUMENTS

| | | | |
|---|---|---|---|
| 5,388,267 A | 2/1995 | Chan et al. | 395/700 |
| 6,298,427 B1 | 10/2001 | Beelitz | 711/173 |
| 6,327,706 B1 | 12/2001 | Amberg et al. | 717/11 |
| 6,353,885 B1 | 3/2002 | Herzi et al. | 713/1 |
| 6,427,091 B1 | 7/2002 | Davis et al. | 700/115 |
| 6,438,688 B1 | 8/2002 | Nunn | 713/2 |
| 6,510,512 B1 | 1/2003 | Alexander | 713/2 |
| 6,550,062 B2 | 4/2003 | Barajas et al. | 717/178 |
| 6,560,701 B1 * | 5/2003 | Berstis et al. | 713/2 |
| 6,640,316 B1 | 10/2003 | Martin et al. | 714/36 |
| 6,714,937 B1 | 3/2004 | Eynon et al. | 707/102 |
| 6,721,946 B1 | 4/2004 | Fogarty et al. | 717/175 |
| 6,765,788 B2 | 7/2004 | Wu | 361/680 |
| 6,792,556 B1 * | 9/2004 | Dennis | 714/6 |
| 6,862,681 B2 * | 3/2005 | Cheston et al. | 713/2 |
| 6,934,546 B1 | 8/2005 | Corbett et al. | 455/441 |
| 6,986,034 B2 | 1/2006 | Tyner et al. | 713/2 |
| 7,000,101 B2 | 2/2006 | Wu et al. | 713/1 |
| 2002/0026571 A1 | 2/2002 | Rickey | 713/2 |
| 2003/0012114 A1 | 1/2003 | Larvoire et al. | 369/100 |
| 2004/0044886 A1 | 3/2004 | Ng et al. | 713/1 |
| 2004/0088692 A1 | 5/2004 | Stutton et al. | 717/168 |
| 2004/0153840 A1 | 8/2004 | Buchanan, Jr. et al. | 714/42 |
| 2004/0255106 A1 * | 12/2004 | Rothman et al. | 713/1 |
| 2005/0005197 A1 | 1/2005 | Chong et al. | 714/36 |
| 2005/0066145 A1 * | 3/2005 | Han et al. | 711/173 |
| 2006/0015732 A1 | 1/2006 | Liu | 713/176 |

(Continued)

*Primary Examiner* — Fahmida Rahman
(74) *Attorney, Agent, or Firm* — Terrile, Cannatti, Chambers & Holland, LLP; Stephen A. Terrile

(57) ABSTRACT

An information handling system is provided with an intelligent boot service which addresses and resolves unbootable system scenarios. The intelligent boot service detects and corrects adverse events before booting into the operating system. The intelligent boot service architecture is extensible to add newer events and is extensible to include extensible firmware interface (EFI) technology.

15 Claims, 3 Drawing Sheets

(56) References Cited

U.S. PATENT DOCUMENTS

| | | | |
|---|---|---|---|
| 2006/0031669 A1 | 2/2006 | Liang et al. | 713/100 |
| 2006/0041738 A1 | 2/2006 | Lai | 713/2 |
| 2006/0041740 A1 | 2/2006 | Hsu | 713/2 |
| 2006/0047940 A1 | 3/2006 | Chiu et al. | 713/2 |
| 2006/0149956 A1 | 7/2006 | Chang | 713/1 |
| 2006/0155988 A1 | 7/2006 | Hunter et al. | 713/164 |
| 2007/0157013 A1* | 7/2007 | Park | 713/1 |
| 2008/0046781 A1* | 2/2008 | Childs et al. | 714/15 |

* cited by examiner

300 — Failed Boot: Cannot find a bootable operating system. Your current BIOS configuration has attempted to find an operating system at the following locations:

1. Built-In CDROM
2. Floppy
3. IDE Controller 0 / Hard Disk 0 / Partition 0

310 — Intelligent Boot Services: You may try the following options based on previous successful boots.

1. IDE Controller 0/ Hard Disk 1 / Partition 1
2. IDE Controller 0/ Hard Disk 2 / Partition 2
3. IDE Controller 0/ Hard Disk 1 / Dell Recovery Partition
4. Reboot and try again.

*Figure 3*

INTELLIGENT BOOT SERVICES

BACKGROUND OF THE INVENTION

1. Field of the Invention

The present invention relates to information handling systems and more particularly to intelligent boot services for use with information handing systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with a basic input output system (BIOS) which recognizes and controls various aspects of the information handling system. BIOS refers to the firmware code executes when the information handling system is first powered on. One function of the BIOS is to prepare the information handling system for other software programs to load, execute, and assume control of the information handling system. This process is referred to as booting up the information handling system.

One issue relating to information handling system can occur while the information handling system is booting up. With known information handling systems, during a boot operation, customers can be presented with a one strike and out BIOS behavior for booting to an installed operating system. If a preferred device boot order is incorrect, known information handling systems do not provide guidance to remediate this issue. Being removed from the BIOS booting sequence can require a customer to have a technical understanding of 'Boot Sequence', Master Boot Records (MBR), Partition Boot Records (PBR), and other boot-related details to begin to resolve this issue. An inability to boot can be caused by a plurality of events including viruses, human error, disk signature corruption or MBR corruption.

With known information handling systems, many calls related to unbootable systems are due to a corruption of the path leading to the operating system bootstrap file. A corruption of this path can include issues relating to the BIOS device boot order configuration, the master boot record, and the bootstrap configuration file (e.g. boot.ini, grub.conf, etc.).

Service calls relating to unbootable systems can be difficult to understand, troubleshoot and resolve. Many unbootable system scenarios can require deep technical expertise and the appropriate tools. In a remote service delivery model, unbootable system scenarios can result in unnecessary dispatches, extended time on task, and potentially negative customer experience. There are no known solutions focused on preventing catastrophic events from happening on a customers system and autocorrecting them before the catastrophic event leads to other serious issues.

Accordingly, it would be desirable to provide an information handling system with an intelligent boot service which can address and resolve unbootable system scenarios.

SUMMARY OF THE INVENTION

In accordance with the present invention an information handling system is provided with an intelligent boot service which addresses and resolves unbootable system scenarios. More specifically, the intelligent boot service detects and corrects adverse events before booting into the operating system. The intelligent boot service provides a better customer experience and also reduces service calls relating to unbootable systems. The intelligent boot services also results in fewer hardware dispatch rates. The intelligent boot service architecture is extensible to add newer events and is extensible to include extensible firmware interface (EFI) technology.

The intelligent boot service includes an intelligent boot service module which flags an event within the BIOS every time a master boot record or partition boot record becomes corrupted. The intelligent boot service module stores and tracks a history of master boot records and partition boot records in a secure location within the information handling system. The intelligent boot service module detects failure in the boot sequence and presents an option to recover from the failure in the boot sequence. The intelligent boot service module provides an option of selecting from different partitions currently setup on the information handling system in the event of a boot failure. The intelligent boot service module also enables recovery from a virus attack and successfully boots to a required partition on the system.

In one embodiment, the invention relates to a method for booting an information handling system. The method includes determining whether a boot failure has occurred during a boot process before booting into an operating system, identifying previous known good boot configuration information, and booting the information handling system using the previous known good boot configuration information when a boot failure occurs.

In another embodiment, the invention relates to an apparatus for booting an information handling system. The method includes means for determining whether a boot failure has occurred during a boot process before booting into an operating system, means for identifying previous known good boot configuration information, and means for booting the information handling system using the previous known good boot configuration information when a boot failure occurs.

In another embodiment, the invention relates to an information handling system which includes a processor and memory coupled to the processor. The memory includes instructions for determining whether a boot failure has occurred during a boot process before booting into an operating system, identifying previous known good boot configuration information, and booting the information handling system using the previous known good boot configuration information when a boot failure occurs.

BRIEF DESCRIPTION OF THE DRAWINGS

The present invention may be better understood, and its numerous objects, features and advantages made apparent to those skilled in the art by referencing the accompanying

FIG. 3 shows a screen presentation of an intelligent boot service.

DETAILED DESCRIPTION

Figure 1:
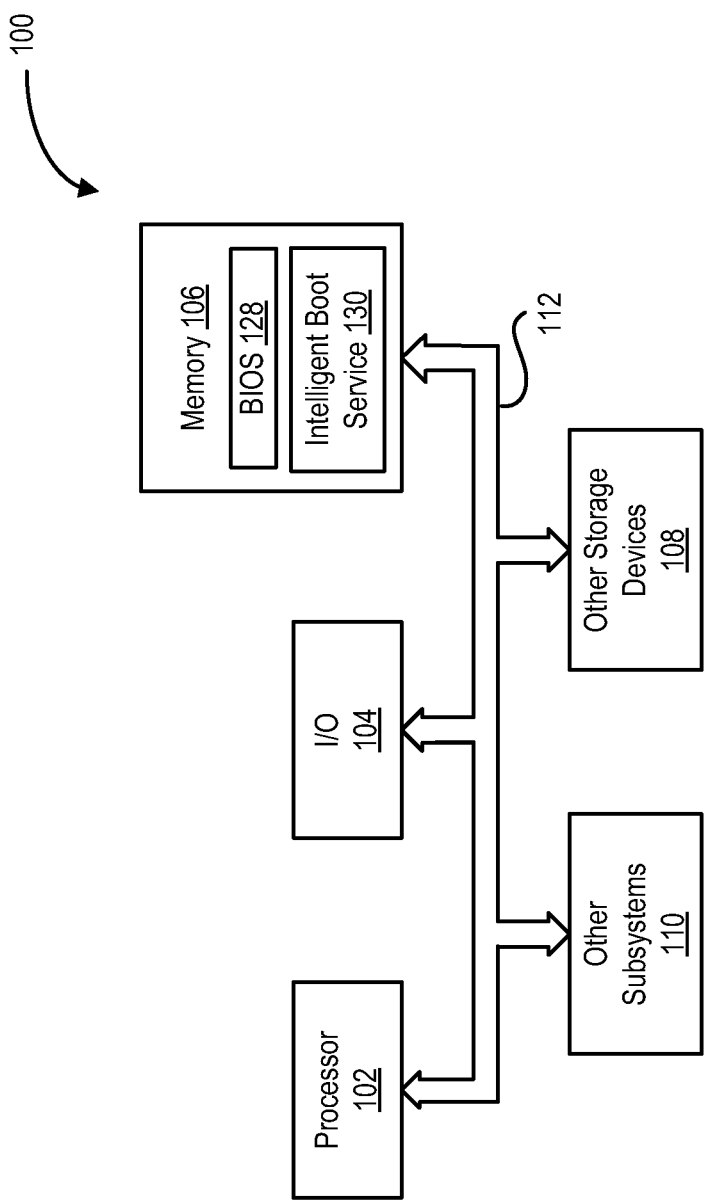
FIG. 1 shows a block diagram of an information handling system.

Referring to FIG. 1, a system block diagram of an information handling system 100 is shown. The information handling system 100 includes a processor 102, input/output (I/O) devices 104, such as a display, a keyboard, a mouse, and associated controllers, memory 106, including volatile memory such as random access memory (RAM) and non-volatile memory such as read only memory (ROM) and hard disk drives, and other storage devices 108, such as a floppy disk and drive or CD-ROM disk and drive, and various other subsystems 110, all interconnected via one or more buses 112. The memory 106 includes a basic input output system 128 as well as an intelligent boot service module 130.

The intelligent boot service module 130 flags an event within the BIOS 128 every time a master boot record or partition boot record becomes corrupted. The intelligent boot service module 130 stores and tracks a history of master boot records and partition boot records in a secure location within the information handling system. The intelligent boot service module 130 detects failure in the boot sequence and presents an option to recover from the failure in the boot sequence. The intelligent boot service module 130 provides an option of selecting from different partitions currently setup on the information handling system in the event of a boot failure. The intelligent boot service module 130 also enables recovery from a virus attack and successfully boots to a required partition on the system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
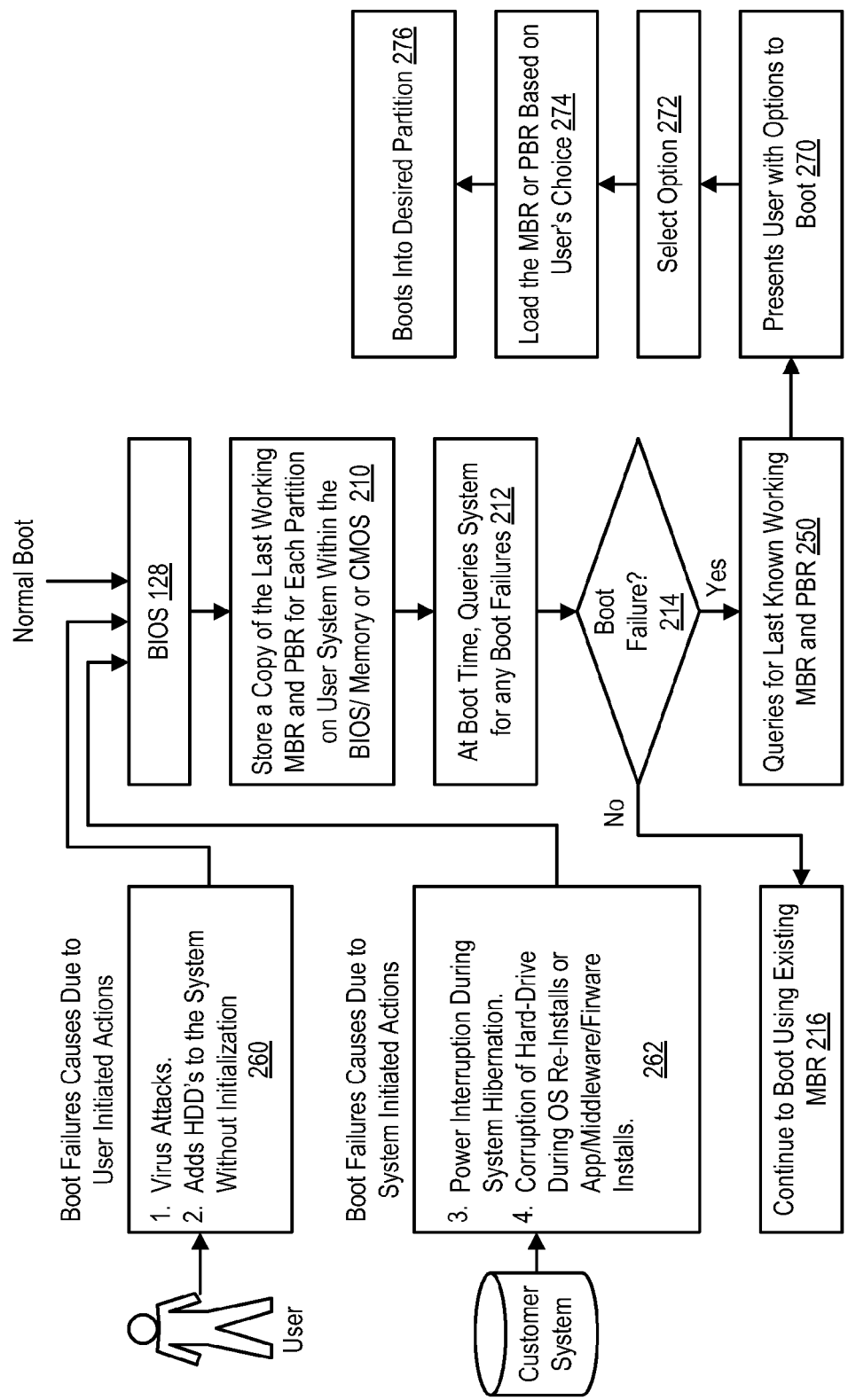
FIG. 2 shows a flow chart of the operation of an intelligent boot service system.

Referring to FIG. 2, a flow chart of the operation of an intelligent boot service is shown. During a normal boot operation (i.e., a boot operation that does not result in a boot failure), the intelligent boot service module 130 store a history of successful device boot sequences as well as master boot record and partition boot record data for failover and recovery purposes within non-volatile memory of the information handling system at step 210. By recording the bootable device, master boot record and partition boot record data available, the BIOS behavior can be extended to offer the use of this data in cases when a virus or human error have compromised the ability to boot to the operating system.

During the boot operation, the BIOS 128 quires the system to determine whether any boot failures occurred at step 212 and if not boot failures occurred, as determined by step 214, then the information handling system 100 continues to boot using an existing MBR at step 216.

If the BIOS 128 does determine that a boot failure occurred at step 214, then the intelligent boot services module 130 collects a last known working MBR from a non-volatile memory location in which the last known working MBR is stored and tries to load the last known good MBR at step 250. The intelligent boot services module 130 also accesses last known good PRB as well as a list of bootable partitions associated with the information handling system. Also at step 250, the intelligent boot services module 130 queries the individual partitions for their respective PBR and uses them to make a recommendation to the user. Thus, if the information handling system is a dual or Multi-boot system with different operating system's setup, the user may be presented with a choice of which partition to boot.

A failure to boot may be the result of a user related issue 260 or a system related issue 262. User related issues 260 include for example, a virus attack or a new hard drive (or other type of bootable storage device) that is added to the information handling system without initialization. System related issues 262 include a power interruption during system hibernation or corruption of a hard drive during operating system reinstall or application, middleware, or firmware install.

After the intelligent boot services module 130 has accessed the last known good MBR or PBR, the intelligent boot services module 130 presents a user with boot options based upon the retrieved information at step 270. A user then selects one of the options at step 272 and the intelligent boot services module 130 loads the MBR or PBR based upon the selection at step 274. The intelligent boot services module 130 then boots into the desired partition at step 276.

Referring to FIG. 3, a screen presentation of an intelligent boot services boot options presentation 300 is shown. More specifically, the intelligent boot service provides a user with one or more options 310 representing proposed solutions to a failed boot sequence based upon previous successful boots of the information handling system. The user may select one of the proposed solutions by entering the number corresponding to the option.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Also for example, the intelligent boot service module 130 may be configured within an architecture which is extensible to add newer events and is extensible to include extensible firmware interface (EFI) technology.

Also for example, it will be appreciated that a plurality of methods may be used to obtain the known good boot records. For example, known good boot records may be stored proactively during the manufacturing of the information handling system, via a recovery application executing on the operating system of the information handling system, or via logic that is included within the BIOS that understands how to scan the hard drive for partitions. The first two methods record the known good partition information in nonvolatile storage independent of the hard drive such as a CMOS or other motherboard based storage location. The third method uses BIOS code that scans or searches the hard-drive for a partition that has a recovery environment for a staged repair. With the third method, a backup or recovery application would be saving the partition information (or other recovery environment information) as part of the backup data.

Consequently, the invention is intended to be limited only by the spirit and scope of the appended claims, giving full cognizance to equivalents in all respects.

What is claimed is:

1. A method for booting an information handling system, the method comprising:
   storing and tracking a history of master boot records and partition boot records in a secure location within the information handling system;
   determining whether a boot failure has occurred during a boot process before booting into an operating system, the boot failure being a result of a system state change;
   identifying previous known good boot configuration information, the identifying being based at least in part on the history of master boot records and partition boot records, the previous known good boot information comprising a known good partition information, the known good partition information being stored in a CMOS non-volatile storage independent of a hard drive of the information handling system;
   booting the information handling system using the previous known good boot configuration information when a boot failure as the result of the system state change occurs; and
   presenting a user with a plurality of boot options based upon the previous known good boot configuration information, the plurality of boot options being based upon the history of master boot records and partition boot records; and wherein
   the storing, determining, identifying, booting and presenting are performed within an architecture, the architecture being extensible to include extensible firmware interface (EFI) technology.

2. The method of claim 1 wherein
the system state change comprises a customer initiated system state change.

3. The method of claim 1 wherein
the system state change comprises a system initiated system state change.

4. The method of claim 1 wherein
the previous known good boot configuration information comprises a known good master boot record.

5. The method of claim 1 wherein
the previous known good boot configuration information comprises alternate boot partitions.

6. An apparatus for booting an information handling system, the apparatus comprising:
   means for storing and tracking a history of master boot records and partition boot records in a secure location within the information handling system;
   means for determining whether a boot failure has occurred during a boot process before booting into an operating system, the boot failure being a result of a system state change;
   means for identifying previous known good boot configuration information, the identifying being based at least in part on the history of master boot records and partition boot records, the previous known good boot information comprising a known good partition information, the known good partition information being stored in a CMOS non-volatile storage independent of a hard drive of the information handling system;
   means for booting the information handling system using the previous known good boot configuration information when a boot failure as the result of the system state change occurs; and
   means for presenting a user with a plurality of boot options based upon the previous known good boot configuration information, the plurality of boot options being based upon the history of master boot records and partition boot records; and wherein
   the means for storing, determining, identifying, booting and presenting are included within an architecture, the architecture being extensible to include extensible firmware interface (EFI) technology.

7. The apparatus of claim 6 wherein
the system state change comprises a customer initiated system state change.

8. The apparatus of claim 6 wherein
the system state change comprises a system initiated system state change.

9. The apparatus of claim 6 wherein
the previous known good boot configuration information comprises a known good master boot record.

10. The apparatus of claim 6 wherein
the previous known good boot configuration information comprises alternate boot partitions.

11. An information handling system comprising:
a processor;
memory coupled to the processor, the memory comprising instructions for:
   storing and tracking a history of master boot records and partition boot records in a secure location within the information handling system;

determining whether a boot failure has occurred during a boot process before booting into an operating system, the boot failure being a result of a system state change;

identifying previous known good boot configuration information, the identifying being based at least in part on the history of master boot records and partition boot records, the previous known good boot information comprising a known good partition information, the known good partition information being stored in a CMOS non-volatile storage independent of a hard drive of the information handling system;

booting the information handling system using the previous known good boot configuration information when a boot failure as the result of the system state change occurs; and presenting a user with a plurality of boot options based upon the previous known good boot configuration information, the plurality of boot options being based upon the history of master boot records and partition boot records; and wherein the storing, determining, identifying, booting and presenting are performed within an architecture, the architecture being extensible to include extensible firmware interface (EFI) technology.

12. The information handling system of claim 11 wherein the system state change comprises a customer initiated system state change.

13. The information handling system of claim 11 wherein the system state change comprises a system initiated system state change.

14. The information handling system of claim 11 wherein the previous known good boot configuration information comprises a known good master boot record.

15. The information handling system of claim 11 wherein the previous known good boot configuration information comprises alternate boot partitions.

* * * * *